Sept. 29, 1936. A. P. ARMINGTON ET AL 2,055,919
POWER WIND FOR TRAILER VEHICLES
Filed March 7, 1935 2 Sheets-Sheet 1
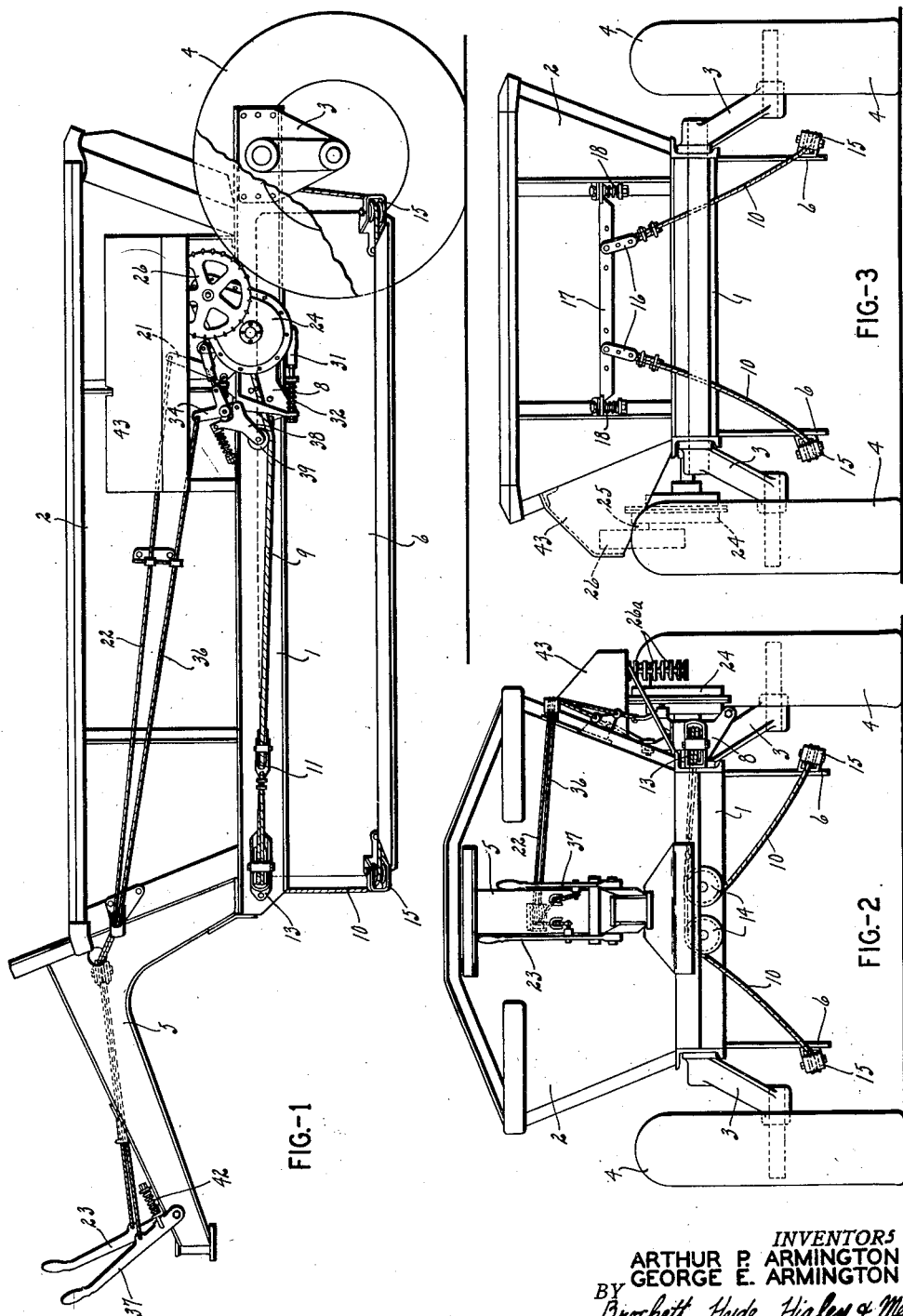
INVENTORS
ARTHUR P. ARMINGTON &
GEORGE E. ARMINGTON
BY Brockett, Hyde, Higley & Meyer
ATTORNEYS Sept. 29, 1936.  A. P. ARMINGTON ET AL  2,055,919
POWER WIND FOR TRAILER VEHICLES
Filed March 7, 1935   2 Sheets-Sheet 2

INVENTORS
ARTHUR P. ARMINGTON &
GEORGE E. ARMINGTON
BY Brockett, Hyde, Higley & Meyer
ATTORNEYS Patented Sept. 29, 1936

2,055,919

UNITED STATES PATENT OFFICE 2,055,919

POWER WIND FOR TRAILER VEHICLES

Arthur P. Armington, Willoughby, and George E. Armington, South Euclid, Ohio, assignors to The Euclid Road Machinery Company, Euclid, Ohio, a corporation of Ohio Application March 7, 1935, Serial No. 9,812

11 Claims. (Cl. 298—35)

This invention relates to means for operating dumping mechanism of a land vehicle, and the invention particularly contemplates a wheeled vehicle having bottom dumping doors, and closing of the doors by power taken from a wheel element of the vehicle when the latter is in motion.

The general objects of the invention are to provide novel means for the purpose, of improved simplicity, cheapness in construction and sureness of operation.

The invention includes actuation of the doors by cable means, in turn actuated by winding gear including a drum. Particular objects of the invention are to provide improved location of this drum, and its drive by a roller through frictional contact with the vehicle wheel. The invention includes also as objects, improved means for adjusting the roller to control its driven contact with the wheel, with automatic termination of the drive when the dumping doors attain closed position.

Figure 4:
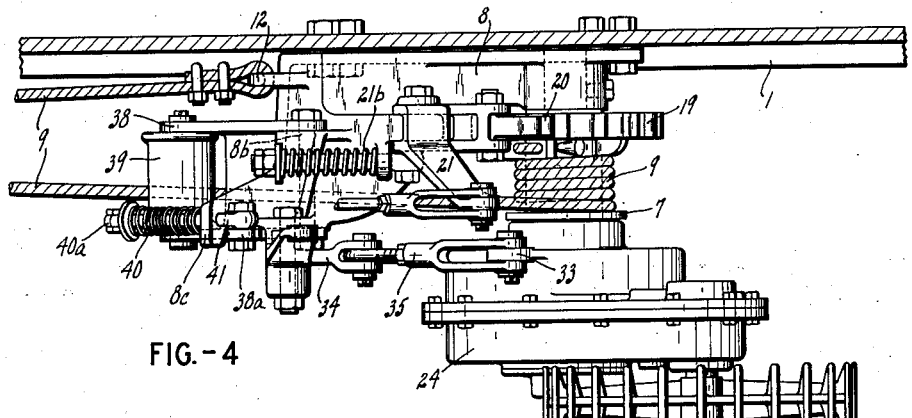
Figure 5:
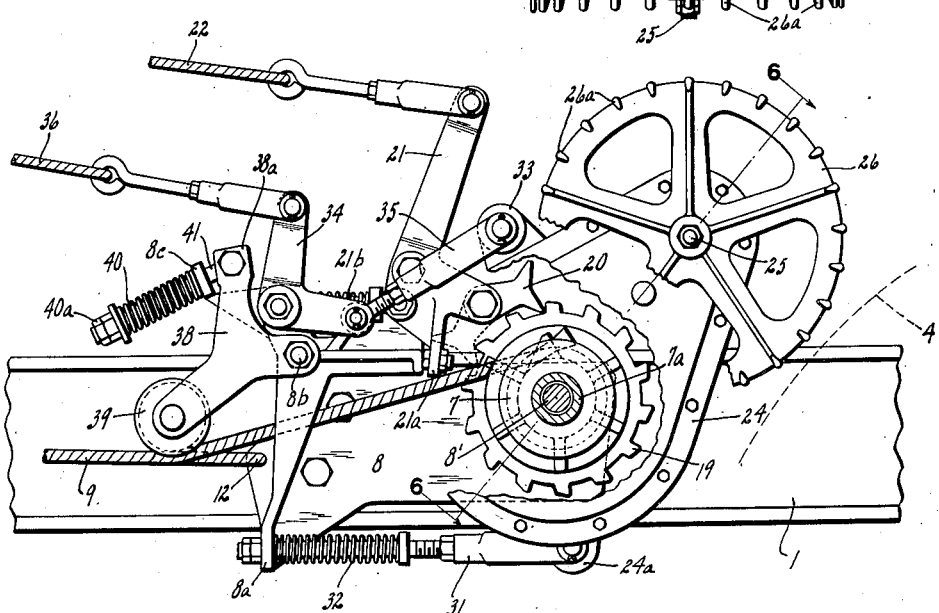
Figure 6:
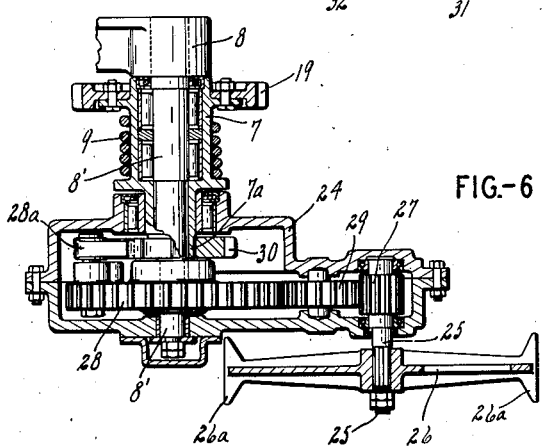

The exact nature of the invention together with further objects and advantages thereof will be apparent from the following description taken in connection with the accompanying drawings, in which Figs. 1, 2, and 3 are side, front and rear elevations respectively of a characteristic vehicle to which an embodiment of the invention has been applied, the dumping parts of the vehicle being shown in dumped position and their control parts being set to return the dumping parts to load-carrying position; Fig. 4 is an enlarged plan detail of the winding gear parts in load-carrying position; Fig. 5 is a side elevation of the same, parts being broken away to show details of construction; and Fig. 6 is a typical section as in the plane of line 6—6, Fig. 5.

With reference now to the drawings, the vehicle here shown has a body including an open frame 1 and an open bottom hopper 2 thereon. The body is supported at the rear upon an arched axle including axle brackets 3 and associated wheels 4. A drawbar 5 is provided at the front end of the body for support at that end, and draft of the vehicle. A pair of doors 6 are provided for control of the dumping opening of the body, each door being mounted to swing about one of the side frame members, downwardly and outwardly to dumping position and inwardly and upwardly to load-carrying position.

The doors are controlled by a drum 7 carried by a bracket 8 secured to one of the side members of the frame 1, and cable means interassociating the drum with both doors. The drum is disposed rotatably on a transverse axis adjacent one of the wheels 4 and the cable means as here shown includes a cable 9 having an end secured with the drum, and a pair of cables 10, one for each door 6. The rigging of the cables includes for the cable 9, a length leading from the drum 7 forwardly along the side of the wagon to and about a floating sheave 11 and thence back to a fixed connection with the bracket 8 as at 12. Each cable 10 leads from a connection with the frame of the sheave 11, in succession about a sheave 13 at the near corner of the body, one of the sheaves 14 at the forward end of the body, sheaves 15 at the free corners of the corresponding door 6, to connections 16 with a bar 17 at the rear of the body. This bar 17 is resiliently mounted upon the body as by springs 18.

It will be apparent that the rigging of the cable means is such that winding operation of the drum 7 will actuate the cable 9 and thereby the cables 10, to close both doors 6 simultaneously; the leverage of the cables 10 upon the doors being 2:1 and the leverage of the cable 9 upon the cables 10 being 2:1.

A ratchet wheel 19 is secured with the drum 7 and a cooperative pawl 20 arranged to positively retain the latter in positions to which it is wound, thereby retaining the doors in positions to which they are moved in closing direction. The securing relation of the pawl 20 with the ratchet wheel 19 is controlled by a bell crank 21 mounted on the bracket 8, having a short arm carrying the pawl 20 and a long arm to which is connected a control cable 22, this cable leading over suitable sheaves as indicated, to a trip lever 23 mounted at the forward end of the drawbar 5 for convenient access to the operator of a tractor vehicle to which the illustrated dumping vehicle may be hitched. When the pawl is in the full line position, Fig. 5, by a pull upon the lever 23 to move the bell crank 21 counterclockwise in Fig. 5, the pawl 20 will swing downwardly and to the left to the dotted line position, Fig. 5, under the action of the ratchet wheel 19, releasing the latter and the drum 7 and permitting dropping of the doors to open position under the action of gravity. Thereafter, upon winding operation of the drum, the ratchet wheel will return the pawl 20 from dotted to full line position wherein the pawl will again be effective to retain the ratchet wheel in wound positions. To prevent the pawl from releasing the ratchet wheel except at the will of the operator, by his manipulation of the lever 21, the latter is provided with an arm 21a engaging a stop part of the bracket 8 to limit clockwise motion of the lever, and suitable spring means indicated at 21b is arranged to be effective between the bracket 8 and lever 21 to yieldably urge the latter against its stop.

For winding actuation of the drum 7, the spindle 8' upon which it has support from the bracket 8, extends outwardly from the vehicle body beyond the drum where it has a housing 24 mounted for adjustment thereabout. A spindle 25 is mounted in the housing 24 eccentric of the drum, and extending outwardly beyond the housing to carry a roller 26 secured thereon. The peripheral part of the roller comprises a series of spaced blades 26a each transversely extending from a central disc-like web part. The parts are so proportioned and arranged that by adjustment of the housing 24 the roller 26 may be brought to bear upon the periphery of the near vehicle wheel 4 as indicated in Fig. 1, or may be raised to clear the wheel as in Fig. 5; the roller 26 and vehicle wheel 4 thus being cooperative with clutch effect.

Means are arranged within the housing 24 providing for drive of the drum 7 by the roller 26, subject to such clutch effect. Such means include a pinion 27 fixed on the spindle 25 of the roller, a gear 28 rotatably mounted upon the spindle 8' and an idler pinion 29 interconnecting the pinion 27 with the gear 28. For drive of the drum 7 by the gear 28, a ratchet wheel 30 is fixed upon a sleeve part 7a extending from the drum 7 within the housing 24, and a pawl 28a is mounted upon the gear 28 for cooperation with the ratchet wheel 30, the arrangement being such that the pawl 28a will drive the wheel 30 in winding direction of the drum 7. It may be observed that the housing 24 bears upon the end part of the spindle 8' beyond the gear 28, and bears upon the extending sleeve part 7a of the drum between the drum face and the gear, whereby alignment of the housing 24 and the parts mounted thereon is amply secured.

A push rod 31 and associated spring 32 are arranged to be effective between a boss part 24a of the housing 24 and a boss part 8a of the bracket 8 to yieldably urge the housing 24 in counterclockwise direction, to maintain the roller 26 clear of the vehicle wheel 4. For the purpose, the push rod has pivotal connection with the boss 24a, is slidable in an opening in the boss 8a, and spring 32 is effective in compression between the boss 8a and the fixed collar indicated on the push rod. Nuts are provided on the sliding end of the push rod to limit counterclockwise motion of the push rod, and the push rod is preferably adjustable as to length as by the threaded connection indicated—so that counterclockwise motion of the housing 24 is limited, and the housing is yieldably maintained against this limit, with its roller 26 clear of the wheel 4, under the effect of the spring 32.

For adjusting the roller against the wheel, the housing 24 is provided with a boss 33, a bell crank 34 is mounted on the bracket 8, and a link 35 is arranged between the boss 33 and the adjacent arm of the bell crank 34. The link 35 is preferably of adjustable length as indicated, and the arrangement is such that the link 35 and its arm of the bell crank 34 together form a toggle, broken downwardly when the roller 26 is in the idle position indicated in Fig. 5. Obviously, straightening motion of these toggle elements will adjust the housing 24 against the action of the spring 32, to bring the roller 26 into driven relation with the wheel 4.

To so adjust the parts, a line 36 is led forwardly of the vehicle from the upwardly extending arm of the bell crank 34, over suitable sheaves, to a lever 37 mounted upon the drawbar 5 adjacent the trip lever 23; by which arrangement the operator of the tractor to which the vehicle is hitched, may actuate the described toggle mechanism to start the winding actuation of the drum 7.

The parts are so proportioned and arranged that upon such action by the operator, the toggle members including the link 35, will move upwardly to bring the knuckle of the toggle slightly beyond center, that is, above the line between the axes upon which the link 35 and bell crank 34 move. Thus, once the operator has initiated the winding of the drum 7, by bringing the roller 26 against the vehicle wheel, the driven relation of the roller will be maintained independent of the operator.

In order that the winding operation of the drum shall terminate automatically when the dumping doors 6 attain closed position, a lever 38 is carried on a fixed axis 8b upon the bracket 8 and carries a follower sheave or roller 39 alongside the cable 9. In the arrangement illustrated, this follower sheave 39 bears against that length of the cable 9 between the drum 7 and the floating sheave 11. A spring 40 is associated with the lever 38 to yieldably urge the sheave 39 bearing against the cable 9. In the arrangement illustrated the spring 40 is a compression spring disposed about a push rod 41 having an end pivotally connected with the arm 38a of the lever 38, extending through an opening in a boss 8c of the bracket 8, and having bolts 40a at its end, adjustably confining the spring 40 against the boss 8c. The part 38a of the lever 38 provides a head engageable with the bell crank lever 34 to move the latter in clockwise direction when the lever 38 is sufficiently moved in clockwise direction. The proportioning and arrangement of the parts is such that the spring 40 has sufficient effect upon the sheave 39 during closing of the doors, that the bell crank lever 34 will not be moved; but as the doors attain closed position, the stretch of the cable 9 bent about the sheave 39 will have sufficient straightening tendency against the sheave to move the lever 38 counterclockwise against its spring 40, engage the bell crank lever 34 to trip the latter and move the toggle members including the link 35 downwardly through and past center, thereby releasing the housing 24 to the action of the spring 32, and terminating drive of the drum 7. As the doors attain closed position, undue stresses in the cables 9 and 10 are relieved by the springs 18 associated with the cables 10 and the spring 40 associated with the cable 9.

Light spring means conventionally indicated at 42, are preferably associated with the levers 23 and 37 to return them to rest position.

Operation will be as follows, assuming the vehicle moving ahead and commencing with its doors open as in Figs. 1 to 3, and the door closing mechanism in idle position as in Figs. 4 and 5. The operator initiates closing of the doors by a forward pull of the closing lever 37 as indicated in Fig. 1, to commence winding actuation of the drum 7 by the wheel 4 through the idler 26 and associated gearing. The closing of the doors takes place gradually as the vehicle advances. As the doors attain closed position against the bottom of the vehicle body, the additional strain upon the cable rigging actuates the lever 38 through the follower sheave 39, to trip the described toggle mechanism, releasing the spring 32 to raise the roller 26 from the wheel 4 and thus automatically terminate the winding actuation of the drum 7. The pawl 20 has meanwhile been engaging the ratchet wheel 19 to retain the drum in positions to which it has been wound, so that upon release of the winding drive, the drum is retained by the pawl and retains the doors closed. The body may then be loaded and the vehicle advanced to dumping position.

When it is desired to dump the load, the operator pulls the trip lever 23. This releases the pawl 20 from the ratchet wheel 19 as already described, which in turn releases the drum so that the latter unwinds and permits the dumping doors to drop by gravity to dumping position, thus emptying the load in the vehicle from its body. As the doors drop, the roller 26 is driven backwardly at rapidly increasing speed, until it has built up substantial energy. When the doors attain fully open position, the pawl 28a is carried by the gear 28 ahead of the ratchet wheel 30, so that the roller 26 expends its energy without effect upon the drum 7, and the latter therefore does not unduly unwind its cable 9. The door-actuating cycle has now been completed and closing of the doors will again follow a pull upon the closing lever 37 as before.

It is to be noted that the roller 26 has wide bearing upon the tire of the vehicle wheel, of such nature as to prevent slipping between the interengaging parts, the engaging face of the roller having large through openings between its teeth 26a, however, so that the roller will not pick up from the wheel sticky earth accumulated on the latter, but rather will cut through and break up such accumulations and clear them from the moving parts.

A housing 43 is preferably disposed over and about the mechanism as indicated in Figs. 1 to 3, by which the mechanism is protected against earth spilled in loading the vehicle.

What we claim is:

1. In a wheeled vehicle having a dumping door, a cable for closing said door and a drum controlling said cable, means providing winding drive of said drum by travelling motion of said vehicle, operator-operable means for initiating said drive, means for automatically maintaining said drive upon its initiation, means responsive to tension in said cable for automatically terminating said drive when said door attains closed position, and means for releasably retaining said drum in a wound position.

2. In a wheeled vehicle having a dumping door, a cable for closing said door and a drum controlling said cable, a roller mounted for adjustment to and from driven relation with a wheel of said vehicle, means providing winding drive of said drum by said roller, operator-operable means for adjusting said roller to said driven relation, means for automatically retracting said roller from said wheel when said door attains closed position, and means for releasably retaining said drum in a wound position.

3. In a wheeled vehicle having a dumping door, a cable for closing said door and a drum controlling said cable, a roller mounted for adjustment to and from driven relation with a wheel of said vehicle, means providing winding drive of said drum by said roller, operator-operable means for adjusting said roller to said driven relation, means responsive to tension in said cable for automatically adjusting said roller from said relation, and means for releasably retaining said drum in a wound position.

4. In a wheeled vehicle having a dumping door, a cable for closing said door and a drum controlling said cable, a roller and means for adjusting said roller to and from driven relation with a wheel of the vehicle, driving connection from said roller to said drum, a follower arranged to provide a bend in said cable and having associated means yieldably tending to increase said bend, and means associating said follower with said adjusting means and arranged to provide release of said roller upon translatory actuation of said follower by said cable.

5. In a wheeled vehicle having a dumping door, a cable for closing said door and a drum controlling said cable, a roller, driving connection from said roller to said drum, means for adjusting said roller to and from driven relation with a wheel of the vehicle, said adjusting means including toggle members, means yieldably opposing straightening of said members, and control means for said toggle members for moving them through straightened position, the parts being so proportioned and arranged that said roller may have said driven relation by adjustment of said toggle members to driving position slightly to one side of straightened position, and said roller may have a free position removed from said wheel by adjustment of said toggle members to an idle position on the other side of straightened position.

6. In a wheeled vehicle having a dumping door, a cable for closing said door and a drum controlling said cable, a roller, driving connection from said roller to said drum, means for adjusting said roller to and from driven relation with a wheel of the vehicle, said adjusting means including toggle members, means yieldably opposing straightening of said members, control means for said toggle members for moving them through straightened position, the parts being so proportioned and arranged that said roller may have said driven relation by adjustment of said toggle members to driving position slightly to one side of straightened position, and said roller may have a free position removed from said wheel by adjustment of said toggle members to an idle position on the other side of straightened position, and means responsive to tension in said cable for moving said toggle members from said driving position past said straightened position.

7. In a wheeled vehicle having a gravity dumping door, a cable for closing said door and a drum controlling said cable, a roll and means for adjusting said roller to and from driven relation with a wheel of said vehicle, and driving connection from said roller to said drum and including reduction gearing and one-way drive means permitting said roller to overrun said drum in unwinding direction, whereby the inertia of said roller will be ineffective to run said cable from said drum.

8. In a wheeled vehicle having a body and a dumping door therefor, a cable for closing said door and a drum controlling said cable, a roller mounted for adjustment to and from driven relation with a wheel of said vehicle, means providing winding drive of said drum by said roller, and means for releasably retaining said drum in wound position, said drum being disposed adjacent said vehicle body, upon an axis transverse of the latter, said roller being disposed beyond said drum from the body, and the roller mounting means being movable about said axis.

9. In a wheeled vehicle having a body and a dumping door therefor, a cable for closing said door and a drum controlling said cable, an oil-tight housing, a roller mounted on the outside of said housing in the plane of a wheel of said vehicle, means providing winding drive of said drum by said roller and including power transmitting means within said housing, and means for releasably retaining said drum in wound positions, said drum being disposed adjacent said vehicle body, upon an axis transverse of the latter, and said housing being movable about said axis to adjust said roller to and from driven relation with said vehicle wheel.

10. In a wheeled vehicle having a body and a dumping door therefor, a cable for closing said door and a drum controlling said cable, a roller, means for mounting said roller on said vehicle, means for adjusting said roller to and from driven relation with a wheel of said vehicle, means providing winding drive of said drum by said roller, and means for releasably retaining said drum in a wound position, said drum being disposed adjacent said vehicle body, upon an axis transverse of the latter, said roller and roller mounting means being movable about said axis, and said roller being disposed in the plane of rotation of said vehicle wheel.

11. In a wheeled vehicle having a dumping door, a cable for closing said door and a drum controlling said cable, means providing winding drive of said drum by travelling motion of said vehicle, operator-operated means for initiating said drive, means for automatically maintaining said drive upon its initiation, means responsive to tension in said cable for automatically terminating said drive when said door attains closed position, and means effective to releasably retain said door in said closed position.

ARTHUR P. ARMINGTON.
GEORGE E. ARMINGTON.